April 19, 1955   B. J. DAIGLE   2,706,334
UNIVERSAL DENTAL ISOLATOR
Filed April 27, 1954   3 Sheets-Sheet 1
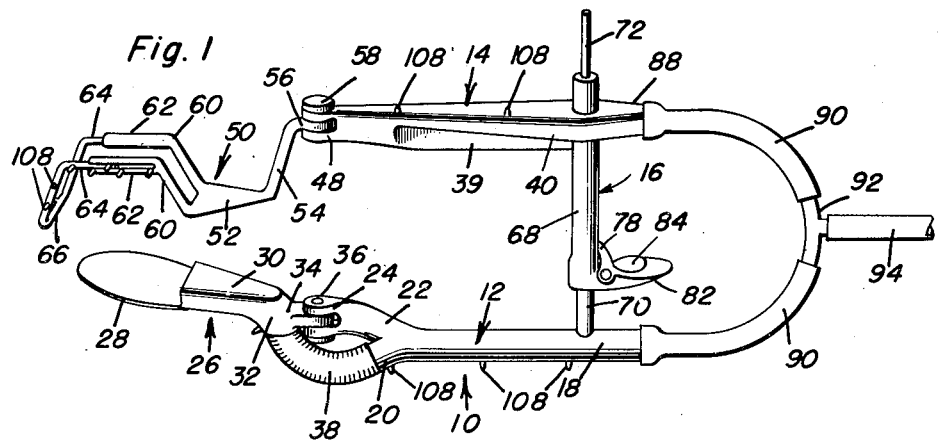
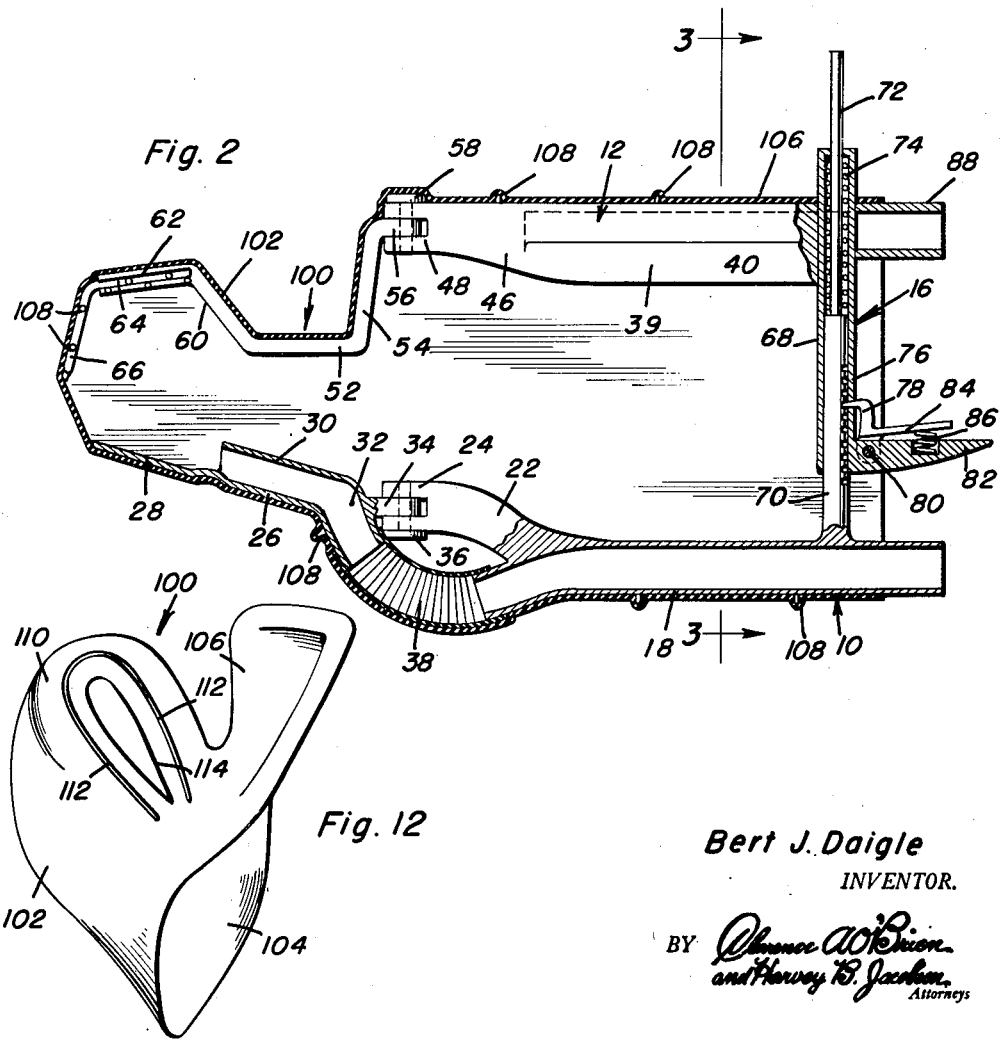
Bert J. Daigle
INVENTOR.

April 19, 1955    B. J. DAIGLE    2,706,334
UNIVERSAL DENTAL ISOLATOR
Filed April 27, 1954    3 Sheets-Sheet 2
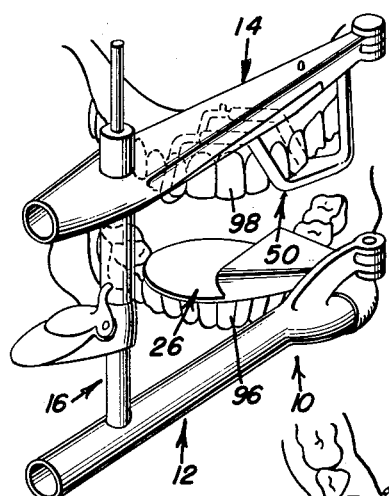
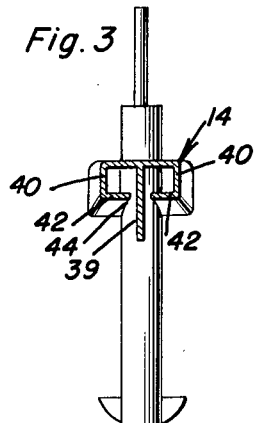
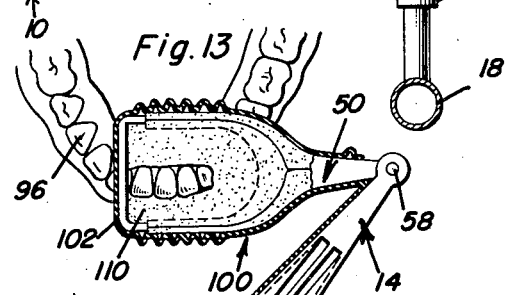
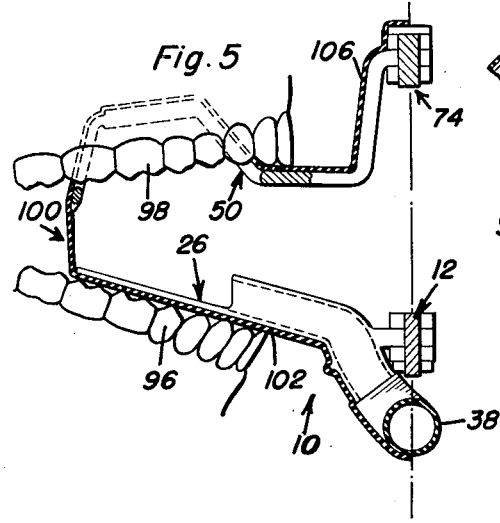
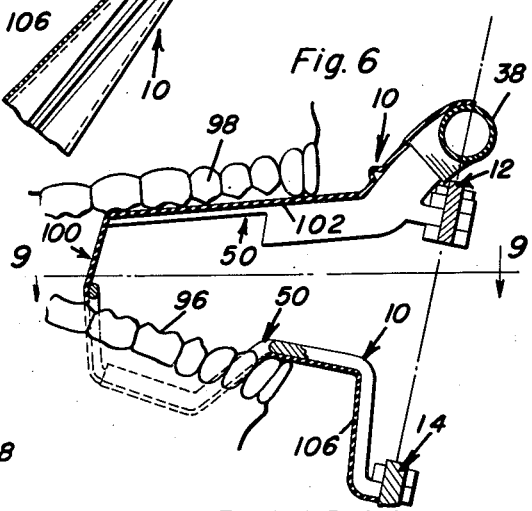
Bert J. Daigle
INVENTOR.

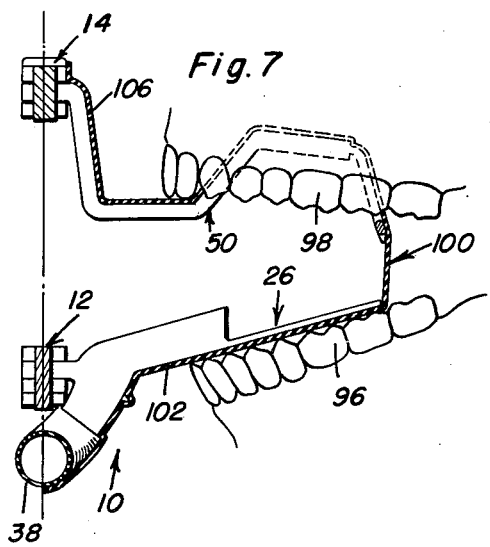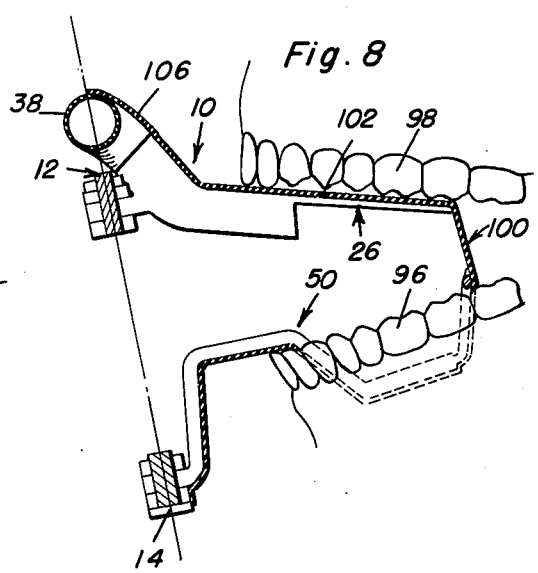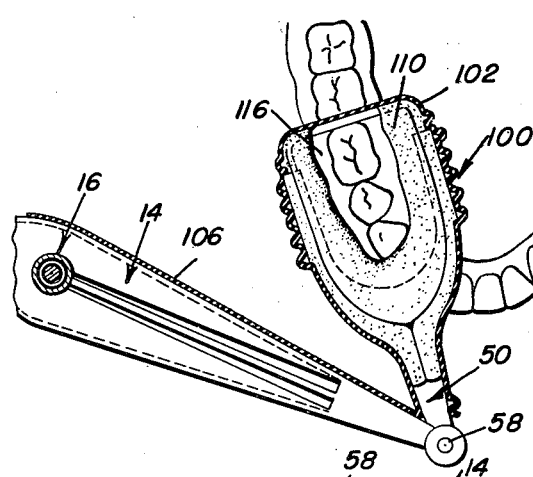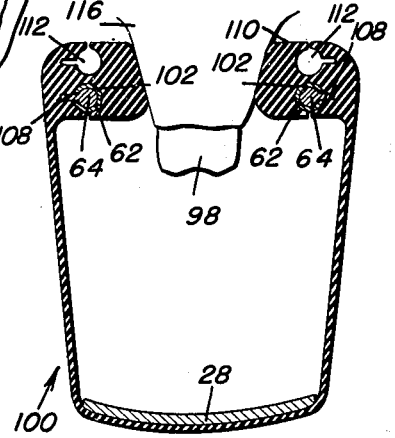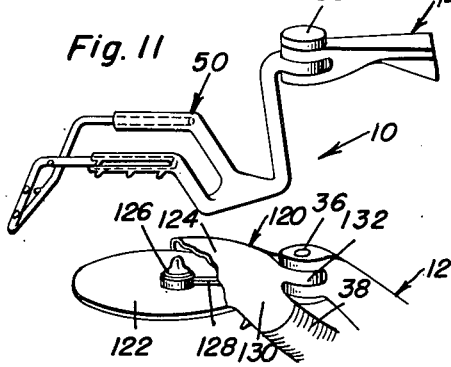
Bert J. Daigle
INVENTOR.

United States Patent Office 2,706,334
Patented Apr. 19, 1955

2,706,334

UNIVERSAL DENTAL ISOLATOR

Bert J. Daigle, Sulphur, La.

Application April 27, 1954, Serial No. 425,820

20 Claims. (Cl. 32—35)

This invention relates in general to improvements in dental equipment, and more specifically to a universal dental isolator intended primarily for use in conjunction with a dental air abrasive technique.

This invention is an improvement on the form of my invention set forth in U. S. application, Serial No. 328,553, filed December 30, 1952, now Patent No. 2,680,908, dated June 15, 1954.

During the recent years, the air abrasive dental technique has begun to become prominent. However, inasmuch as this dental technique involves the spraying of particles against a tooth being treated, it is necessary that means be provided for removing the particles from a patient's mouth. Heretofore, there have been devised special types of dental isolators which may be placed in a patient's mouth for the purpose of confining the air abrasive dental technique to a single tooth. However, the previously developed dental isolators were of such a nature whereby the dental isolator was intended for only a certain group of teeth, and a number of such dental isolators must be retained on hand.

It is therefore the primary object of this invention to provide a universal dental isolator which is of such a nature whereby a single dental isolator may be utilized in the treating of any teeth of a patient's mouth with the air abrasive dental technique.

Another object of this invention is to provide an improved universal dental isolator which may be conveniently placed in a patient's mouth in any desired position to isolate one or more individual teeth, the dental isolator being provided with vacuum means whereby the dental isolator not only isolates a tooth to be treated, but also may be utilized for the removal of the particles utilized in the air abrasive dental technique.

Another object of this invention is to provide an improved universal dental isolator which includes an extensible support which has pivotally carried thereby a bite plate and a tooth isolating frame, the bite plate and the tooth isolating frame being movable to desired positions whereby they may be positioned relative to a tooth to be isolated for treatment.

A further object of this invention is to provide an improved dental dam in the form of a resilient cone for use in combination with a dental isolator frame, the cone being of such a nature whereby it may be easily disposed over the dental isolator frame and use in combination therewith for isolating a single tooth.

A still further object of this invention is to provide an improved resilient cone for use in combination with a dental isolator, the resilient cone including an ear construction which is securable to adjacent parts of an isolator frame for the purpose of protecting the exterior of a patient's mouth, the cone being of such construction whereby it may be turned inside out for use on opposite sides of a patient's mouth in combination with the universal dental isolator which is the subject of this invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a dental isolator frame portion of the universal dental isolator which is the subject of this invention and shows the general details thereof;

Figure 2 is an enlarged fragmentary sectional view taken through the dental isolator frame of Figure 1 when provided with its associated dental dam, the lower portion of the isolator frame and a support bar thereof only being shown in section in order to clearly illustrate the manner in which the upper and lower portion of the isolator frame may be selectively spaced;

Figure 3 is an enlarged transverse vertical sectional view taken substantially upon the plane indicated by the section line 3—3 of Figure 2 and shows the general cross-section of the support arms of the dental isolator frame, the dental dam being omitted for purposes of clarity;

Figure 4 is a perspective view of the dental isolator frame and shows the same being utilized for isolating upper front teeth as an initial step in an air abrasive dental technique, the dental dam not being utilized;

Figure 5 is an enlarged fragmentary sectional view taken through the centers of a bite plate portion and a tooth isolating frame of the dental isolator and shows the same in position isolating several teeth at the upper right side of a patient's mouth, the tooth isolating frame only being shown in section;

Figure 6 is a sectional view similar to that of Figure 5 and shows the universal dental isolator in an inverted position with lower right teeth of a patient being isolated for a dental technique;

Figure 7 is an enlarged fragmentary sectional view similar to Figure 5 and shows the universal dental isolator in a rotated position and being utilized to isolate upper left teeth of a patient's mouth;

Figure 8 is a fragmentary sectional view similar to Figure 7 and shows the universal dental isolator in an inverted position as compared to the position of Figure 7 and being utilized to isolate lower left teeth of a patient's mouth;

Figure 9 is a horizontal sectional view taken substantially upon the plane indicated by the section line 9—9 of Figure 6 and shows the relationship of the universal dental isolator with respect to teeth being isolated;

Figure 10 is an enlarged fragmentary sectional view taken through the inner portion of the universal dental isolator and shows the relationship thereof with respect to the gum of a patient's mouth and teeth being isolated;

Figure 11 is an enlarged fragmentary perspective view of that end of the dental isolator frame which is placed in the patient's mouth and shows a modified form of bite plate which includes a light for illuminating the teeth being worked upon;

Figure 12 is a perspective view of the dental dam which is utilized in combination with the dental isolator frame; and Figure 13 is an enlarged fragmentary horizontal sectional view similar to Figure 9 but looking upwardly and shows the universal dental isolator in the position shown in Figure 4 with the dental dam being utilized.

Referring now to the drawings in detail, it will be seen that there is illustrated the dental isolator frame which is a major part of the present invention. The dental isolator frame is referred to in general by the reference numeral 10 and includes a support arm 12 and a spaced support arm 14, which arms are connected together by a support bar 16.

The support arm 12 includes a tubular outer portion 18 which terminates at its inner end in a tubular connecting portion 20 and a connecting arm 22. The connecting arm 22 is provided at its extreme inner end with a bifurcation 24. Carried by the bifurcation 24 is a bite plate which is referred to in general by the reference numeral 26.

The bite plate 26 includes an elongated tongue engageable portion 28 which has disposed at the outer end thereof a hood 30 which in connection with the tongue engageable portion 28 forms a suction head. The bite plate 26 includes a tubular outer portion 32 which has extending outwardly therefrom a lug 34. The lug 34 is disposed between portions of the bifurcations 24 and is connected thereto for pivotal movement by a vertical pivot pin 36. The tubular portion 32 is connected to the tubular connection 20 by a flexible tube 38.

Referring now to Figure 3 in particular, it will be seen that the support arm 14 is formed of a vertical plate 39 which has secured to the upper edge thereof on opposite sides thereof channels 40. The channels 40 are disposed in opposed relation and have lower flanges 42 which terminate short of the opposed faces of the plate 39 to form elongated openings 44. It will be noted that the vertical plate 39 extends below the channels 40 and functions as a deflector in a manner to be described in more detail hereinafter.

The support arm 14 has a solid inner end portion 46 which terminates in a bifurcation 48. Carried by the bifurcation 48 is a tooth isolating frame which is referred to in general by the reference numeral 50.

The tooth isolating frame 50 includes a central web 52 which is offset towards the bite plate 26. Extending upwardly and outwardly from the outer end of the web 52 is an arm 54 which has formed integral therewith a tab 56 which is disposed between adjacent parts of the bifurcation 48. The tab 56 is connected to the bifurcation 48 by a vertical pivot pin 58 which is coaxial with the pivot pin 36. Extending inwardly from the web 52 are spaced, generally L-shaped frame portions 60.

It will be noted that the frame portions 60 have tubular inner ends 62 in which are received horizontal legs 64 of a generally U-shaped frame portion 66, the major portion of the frame portion 66 extending downwardly away from the horizontal legs 64. The horizontal legs 64 are telescoped within the inner ends 62 for adjustable positioning with respect thereto whereby the effective size of the tooth isolating frame 50 may be varied, as desired.

Referring now to Figures 1 and 2 in particular, it will be seen that the support bar 16 includes a sleeve 68 which is carried by the support arm 14 and which extends therethrough. Carried by the support arm 12 is a rod 70 which is telescoped within the adjacent portion of the sleeve 68. The rod 70 has a reduced extension 72 which carries a coil spring 74 disposed within a remote portion of the sleeve 68. The spring 74 urges the rod 70 out of the sleeve 68.

In order that the support arms 12 and 14 may be retained in adjusted positions relative to each other, the rod 70 is provided with a rack portion 76 which has selectively engageable therewith a dog 78. The dog 78 is pivotally carried by a pivot pin 80 which is part of a finger engaging member 82 carried by the sleeve 68. Extending between a finger engageable portion 84 of the dog 78 and the finger engaging member 82 is a coil spring 86 which retains the dog 78 in engagement with the rack 76. Inasmuch as the rack 76 is on one portion only of the rod 70, it will be seen that the support bars 16 will not only retain the support arms 12 and 14 in spaced relation, but will also prevent rotation of the support arms out of a common plane.

It will be noted that the support arm 14 is provided at the extreme outer end thereof with a tubular extension 88. Disposed over the tubular portions 18 and 88 are ends of flexible vacuum lines 90. The flexible vacuum lines 90 are connected to a T-fitting 92 which, in turn, is connected to a main vacuum line 94 which may be connected to a suitable vacuum source.

Although the dental isolator frame 10 is intended primarily to be utilized in combination with a dental dam, to be described in detail hereinafter, if desired, in certain cases it may be utilized by itself for the purpose of isolating teeth. Referring now to Figure 4 in particular, it will be seen that the dental isolator frame 10 is being utilized for isolating upper front teeth of a patient's mouth in conjunction with an air abrasive dental technique. When the dental isolator frame 10 is properly positioned, the bite plate 26 both overlies lower teeth 96 and is partially disposed within a patient's mouth to depress the patient's tongue (not shown). At the same time, the tooth isolating frame 50 has received therein certain of the front teeth to be worked upon. In order that the remainder of the dental isolator frame 10 may be in an out-of-the-way position, the support arms 12 and 14, together with the support bar 16 are swung to the right side of the patient's mouth exteriorly thereof.

When the dental isolator frame 10 is positioned as illustrated in Figure 4 and an air abrasive dental technique is being utilized, the particles utilized in the air abrasive dental technique will impinge against the selected one of the upper teeth 98. The major portion of the particles (not shown) will fall downwardly upon the bite plate 26 and be drawn into the suction hood 30 thereof due to the vacuum produced in the suction hood 30 and in the support arm 12. At the same time, some of the particles will richochet off the upper tooth 98 being worked upon and will strike the deflector plate 39 of the support arm 14. Inasmuch as the support arm 14 is in fact a suction head due to the provision of the elongated openings 44 therein adjacent the deflector plate 39, the particles engaging the deflector plate 39 will be drawn into the support arm 14. Due to the particular relationship and sizes of the bite plate 26 and the support arm 14, it will be seen that a dental dam will not be needed to prevent particles from entering the patient's mouth. However, a dental dam may be used, if desired, as shown in Figure 13.

Referring now to Figure 5 in particular, it will be seen that the dental isolator frame 10 has been rotated slightly to the right so that the tooth isolating frame 50 thereof has received therein the rear teeth of the upper teeth 98. At the same time, the bite plate 26 has also been moved around to the rear of the right side of the patient's mouth and now overlies both the lower rear teeth at the right side of a patient's mouth and the rear right side of the patient's tongue. The dental isolator frame 10 is now properly positioned for isolating rear ones of the upper teeth 98 for a dental technique. At the same time, the support arms 12 and 14 are disposed along the right rear side of a patient's mouth exteriorly thereof to protect the exterior part of the patient's face.

Referring now to Figure 6 in particular, it will be seen that the dental isolator frame 10 has been inverted from the position illustrated in Figure 5. In the inverted position, the tooth isolating frame 50 has received therein right rear ones of the lower teeth 96. It is these teeth which are intended to be isolated for a dental technique. At the same time, the bite plate 26 is now in engagement with the right rear upper teeth 98. While the bite plate 26 will not function as a tongue depressor when the dental isolator frame 10 is in this position, it does provide a suitable biting surface for the upper teeth 98 so as to prevent the closing of the patient's mouth. Further, the inwardly projecting portion of the tooth isolating frame 50 which is disposed entirely within the confines of the patient's mouth will depress the patient's tongue if necessary to retain it in an out-of-the-way position. Although the relative positions of the support arms 12 and 14 have not been illustrated due to the fact that Figure 6 is a sectional view, it is to be understood that they remain alongside the right side of the patient's mouth exteriorly thereof. In Figure 9, the particular relationship of the support arm 14 with respect to the patient's mouth is best illustrated.

Referring now to Figure 7, it will be seen that the dental isolator frame 10 has been rotated from the position illustrated in Figure 5 so that the tooth isolating frame 50 has received therein left rear ones of the upper teeth 98. At the same time, the bite plate 26 overlies both the lower teeth 96 and the patient's tongue. Further, the bite plate 26 forms a suitable biting surface. Although it has not been clearly illustrated, it is to be understood that the support arms 12 and 14 have been swung around so that they lie adjacent the left side of the patient's mouth exteriorly thereof.

Referring now to Figure 8 in particular, it will be seen that the dental isolator frame 10 has been inverted from the position illustrated in Figure 7. The tooth isolating frame 50 now receives rear left ones of the lower teeth 96. Also, the bite plate 26 now underlies the upper left rear teeth and forms a biting surface for the upper teeth 98. The support arms 12 and 14 remain alongside the left side of the patient's mouth exteriorly thereof.

From the foregoing, it will be seen that the dental isolator frame 10 is of a universal nature inasmuch as the single dental isolator frame 10 may be utilized for isolating all teeth of a patient's mouth. The only adjustment required in the use of the dental isolator frame 10 is to either shorten or elongate the effective length of the tooth isolating frame 50 so as to accommodate more or less teeth, to vertically adjust the spacing between the support arms 12 and 14 through the use of the support bar 16, and to pivotally adjust the tooth isolator frame 50 and the bite plate 26 with respect to their respective support arms 14 and 12.

While it is possible to utilize the dental isolator frame 10 by itself for the purpose of isolating a tooth and removing the particles utilized in an air abrasive dental technique, it is preferred that in many of the cases, the dental isolator frame 10 be provided with a dental dam, such as the dental dam illustrated in Figure 12 and referred to in general by the reference numeral 100. The dental dam 100 is formed of a resilient material preferably rubber or a rubber product and includes a cone portion 102. Formed integral with the cone portion 102 and extending to one side of an opening 104 thereof is an ear 106. It is to be understood that the cone portion 102 is of a size to be received over the bite plate 26 and the tooth isolating frame 50. This relationship is illustrated in many of the figures of the drawings. Also, the ear 106 is intended to be secured to the support arms 12 and 14 alongside thereof, the ear 106 being intended to be disposed between the support arms 12 and 14 and an adjacent portion of the exterior of a patient's face. In order that the dental dam 100 may be retained in place, the support arms 12 and 14, the bite plate 26, and the tooth isolating frame 50 are provided with a plurality of spaced teats 108. The teats 108 engage the various portions of the dental dam 100 and retain it in position.

The cone portion 102 of the dental dam 100 includes a thickened portion 110 which is preferably formed of a sponge rubber. It will be noted that the thickened portion 110 of the dental dam 100 which is intended to be engaged with the tooth isolating frame 50 is provided with suitable grooves 112 for the reception of the tooth isolating frame 50.

The thickened part 110 is provided with an elongated slot 114. The slot 114 is intended to have passed therethrough the teeth to be isolated, as is best illustrated in Figures 5 through 10, inclusive, and is intended to have the boundaries thereof resiliently engage the gum 116 of the teeth which are being isolated, as is best illustrated in Figure 10.

It will be noted that the relationship of the ear 106 with respect to the cone portion 102, as illustrated in Figure 12, is such that the dental dam illustrated in Figure 12 can be utilized only in isolating upper left teeth and lower right teeth. However, the dental dam 100 may be turned inside out, at which time the relationship of the ear 106 with respect to the cone portion 102 will be reversed and the same dental dam 100 may be used in isolating lower left teeth and upper right teeth. In order that the dental dam 100 may receive portions of the tooth isolating frame 50 in both positions, there is provided a second set of grooves 112 in the opposite face of the thickened part 110.

Although in many cases, it is highly desirable to provide the dental dam with an ear, such as the ear 106, under certain circumstances, the ear 106 would not be necessary. Thus, it will be seen that the ear 106 could be eliminated without destroying the spirit of the invention, in which case, it would not be necessary for the dental dam to be of such a construction so as to be turned inside out for use with teeth in various portions of a patient's mouth.

It is also pointed out that while the support arms 12 and 14 are intended to be utilized for the removal of particles from a patient's mouth or from within the dental dam 100, if so desired, the vacuum lines 90 could be omitted and a conventional type of suction hood could be utilized in combination with the universal dental isolator which is the subject of this invention. Further, it is to be understood that the dental isolator is not limited to use in conjunction with an air abrasive dental technique.

Referring now to Figure 11 in particular, it will be seen that there is illustrated a dental isolator frame which includes a slightly modified form of bite plate which is referred to in general by the reference numeral 120. The bite plate 120 is very similar in construction to the bite plate 26 and includes a tongue engaging portion 122 and a hood portion 124. Carried by the surface of the tongue engaging portion 122 opposing the hood portion 124 and just inwardly of the hood portion 124 is a small electric light 126. The electric light 126 has connected thereto wires 128 which may pass into the flexible tube 38 and be connected to a conventional electric source. The bite plate 120 also includes a tubular outer portion 130 which has carried thereby a connecting lug 132.

Although use of the universal dental isolator in combination with a dental air abrasive technique is a primary example of the advantages of the invention, it is to be understood that the universal dental isolator is not intended to be so limited as to possible use. If so desired, the isolator may be utilized equally as well in the extraction of teeth, medication of pyorrhea and all other forms of operative dentistry, especially those which require dry and sterile areas of operation. It is also to be understood that the opening in the dental dam may selectively be of a size to receive only one tooth or a series of teeth and if so desired, may be configurated to permit the treatment of the gum. Accordingly, at any time that reference has been made to a tooth, it is to be understood the reference does or may apply to a series of teeth or teeth and gum.

From the foregoing, it will be seen that there has been illustrated and described a universal dental isolator which is of such a construction whereby it may be utilized in conjunction with dental techniques in patients' mouths regardless of age of the patient or the size of the patient's mouth and for the purpose of isolating any tooth or series of teeth of a patient's mouth without any modification of the dental isolator.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate.

2. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said support bar being extensible whereby the spacing between said bite plate and said tooth isolating frame may be selectively varied.

3. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth.

4. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, said support bar being extensible whereby the spacing between said bite plate and said tooth isolating frame may be selectively varied.

5. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having an opening therein alignable with said tooth isolating frame for receiving a tooth whereby a tooth may be isolated from the remainder of a patient's mouth.

6. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having an opening therein alignable with said tooth isolating frame for receiving a tooth whereby a tooth may be isolated from the remainder of a patient's mouth, said cone being provided with an ear securable to said support arms to protect the exterior of a patient's mouth.

7. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having an opening therein alignable with said tooth isolating frame for receiving a tooth whereby a tooth may be isolated from the remainder of a patient's mouth, said cone being provided with an ear securable to said support arms to protect the exterior of a patient's mouth, said resilient cone having grooves formed therein receiving portions of said tooth isolating frame.

8. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having an opening therein alignable with said tooth isolating frame for receiving a tooth whereby a tooth may be isolated from the remainder of a patient's mouth, said cone being provided with an ear securable to said support arms to protect the exterior of a patient's mouth, said resilient cone having grooves in opposite faces thereof for receiving portions of said tooth isolating frame, said cone being turnable inside out whereby said cone may be utilized in all positions of the dental isolator.

9. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having a thickened portion with an opening therein alignable with said tooth isolating frame for receiving a tooth whereby a tooth may be isolated from the remainder of a patient's mouth.

10. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having a thickened portion with an opening therein alignable with said tooth isolating frame for receiving a tooth whereby a tooth may be isolated from the remainder of a patient's mouth, said thickened portion being formed of sponge rubber.

11. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, and a resilient cone received over said bite plate and said tooth isolating frame, said resilient cone having a thickened portion with an opening therein alignable with said tooth isolating frame for receiving a tooth whereby a tooth may be isolated from the remainder of a patient's mouth, said thickened portion having grooves in opposite faces thereof for receiving portions of said tooth isolating frame, said cone being turnable inside out whereby said cone may be utilized in all positions of the dental isolator.

12. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, said bite plate including a suction hood.

13. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, said bite plate including a suction hood, the support arm connected to said bite plate being in the form of a vacuum tube, said suction hood being connected to said vacuum tube by flexible tubing to facilitate the pivoting of said bite plate relative to its associated support arm.

14. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, the support arm connected to said tooth isolating frame being in the form of an elongated suction head, a vacuum line connected to said one end thereof.

15. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, the support arm connected to said tooth isolating frame being in the form of an elongated suction head, a vacuum line connected to said one end thereof, the last mentioned support arm being formed by a vertical plate having secured to opposite sides thereof opposed channels, said channels having lower flanges terminating short of said vertical plate to form elongated inlets.

16. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, the support arm connected to said tooth isolating frame being in the form of an elongated suction head, a vacuum line connected to said one end thereof, the last mentioned support arm being formed by a vertical plate having secured to opposite sides thereof opposed channels, said channels having lower flanges terminating short of said vertical plate to form elongated inlets, said vertical plate extending below said channels to form a deflector.

17. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, said bite plate including a suction hood, the support arm connected to said bite plate being in the form of a vacuum tube, said suction hood being connected to said vacuum tube by flexible tubing to facilitate the pivoting of said bite plate relative to its associated support arm, the support arm connected to said tooth isolating frame being in the form of an elongated suction head, a vacuum line connected to said one end thereof, said vacuum line being also connected to said vacuum tube.

18. A dental isolator comprising a pair of spaced support arms, a support bar extending between said support arms and connecting said support arms together adjacent one end thereof, a bite plate carried by one of said support arms, a tooth isolating frame carried by the other of said support arms in vertical alignment with said bite plate, said bite plate and said tooth isolating frame being pivotally connected to their respective support arms, whereby the dental isolator may be utilized to isolate any tooth, pivots of said bite plate being vertically aligned and coaxial.

19. A tooth isolating cone for use in combination with a dental isolator frame, said cone being resilient and having a thickened portion, said thickened portion having an elongated slot for receiving at least one tooth, boundaries of said slot being intended to engage a portion of a gum for such tooth.

20. A tooth isolating cone for use in combination with a dental isolator frame, said cone being resilient and having a thickened portion, said thickened portion having an elongated slot for receiving at least one tooth, boundaries of said slot being intended to engage a portion of a gum for such tooth, said thickened portion having grooves in opposite faces thereof for receiving portions of a tooth isolating frame, said cone being turnable inside out whereby said cone may be utilized in all positions of the dental isolator.

No references cited.